US006734406B1

(12) United States Patent
Lindenthal et al.

(10) Patent No.: US 6,734,406 B1
(45) Date of Patent: May 11, 2004

(54) METHOD FOR IMPROVING THE MECHANICAL PROPERTIES OF JOURNAL CROSSES BY INDUCTION HEATING

(75) Inventors: Hans Lindenthal, Heidenheim (DE); Andreas Asch, Heidenheim (DE)

(73) Assignee: Voith Turbo GmbH Co. KG (DE)

( * ) Notice: Subject to any disclaimer, the term of this patent is extended or adjusted under 35 U.S.C. 154(b) by 0 days.

(21) Appl. No.: 10/130,182

(22) PCT Filed: Oct. 25, 2000

(86) PCT No.: PCT/EP00/10486

§ 371 (c)(1),
(2), (4) Date: Aug. 19, 2002

(87) PCT Pub. No.: WO01/34851

PCT Pub. Date: May 17, 2001

(30) Foreign Application Priority Data

Nov. 10, 1999 (DE) .......................................... 199 54 178

(51) Int. Cl.$^7$ .............................. H05B 6/14; H05B 6/40
(52) U.S. Cl. ....................... 219/635; 219/639; 219/640; 219/676; 148/573; 266/129
(58) Field of Search ................................. 219/635, 639, 219/640, 632, 672, 676, 677, 647, 655, 656; 148/567, 573, 572; 266/129

(56) References Cited

U.S. PATENT DOCUMENTS

| | | | | |
|---|---|---|---|---|
| 2,857,154 A | * | 10/1958 | Jones | 219/640 |
| 3,593,973 A | * | 7/1971 | Dehn | 219/640 |
| 3,684,854 A | | 8/1972 | Nikonov et al. | 219/10.69 |
| 3,696,225 A | | 10/1972 | Kalner et al. | 219/10.79 |
| 3,775,831 A | * | 12/1973 | Cachat | 219/640 |

FOREIGN PATENT DOCUMENTS

| | | |
|---|---|---|
| DE | 1955010 | 12/1970 |
| DE | 4339204 | 7/1994 |

* cited by examiner

*Primary Examiner*—Philip H. Leung
(74) *Attorney, Agent, or Firm*—Ostrolenk, Faber, Gerb & Soffen, LLP

(57) ABSTRACT

The invention relates to a method for improving the mechanical properties, especially the hardness, of journal crosses for use in articulated shafts. According to the invention, a superficial area which is defined by the transition surfaces between two journals that are adjacent to each other in the peripheral direction and the superficial areas of the peripheral surfaces of the adjacent journals that point in the peripheral direction is induction-hardened in one method step and then quenched with cooling agents.

5 Claims, 2 Drawing Sheets

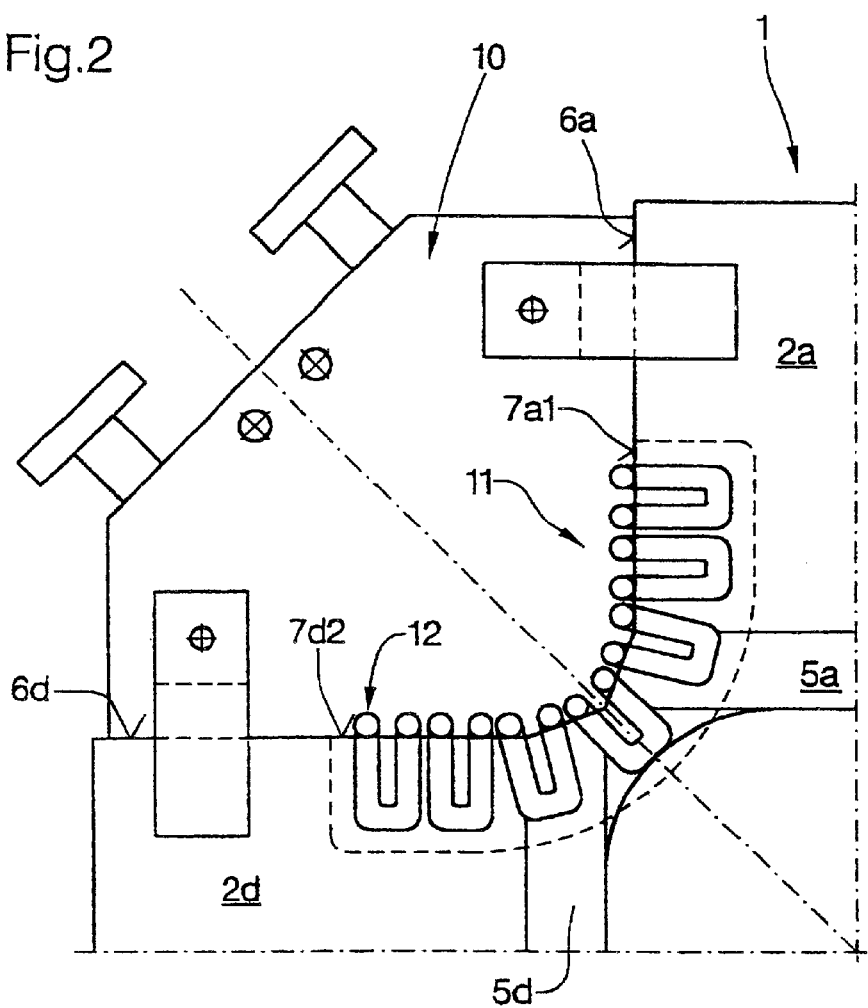

METHOD FOR IMPROVING THE MECHANICAL PROPERTIES OF JOURNAL CROSSES BY INDUCTION HEATING

BACKGROUND OF THE INVENTION

The invention relates to a method for improving the mechanical properties, especially the hardness, of journal crosses for use in articulated shafts, specifically journal crosses having a plurality of journals in the peripheral direction and having journal roots with transition surfaces between the roots, and relates to a journal cross and also to a device for carrying out the method.

A journal cross comprises four journals which are arranged offset 90° from one another, as seen in the peripheral direction. They are connected to one another in the region of their journal roots. The journal crosses are used in articulated shafts for the purpose of torque transmission. The articulated shafts can be designed for a very wide range of applications. Particularly in heavy articulated shafts, the individual elements are under certain circumstances exposed to enormously high loads. This applies certain minimum demands on the condition of the component, in particular on its mechanical properties. The loads which act on the journal cross require a hard surface and, under certain circumstances, a low-wear surface. Because of the permanent dynamic loading in the form of peripheral bending stresses, a hard surface layer and a tough core are desired for the journal cross. Surfaces of the journals of a journal cross and also the transition surfaces provided between two journals, which are arranged offset through 90° with respect to one another, as seen in the peripheral direction, are to be hardened. These transition surfaces are also referred to as saddle surfaces. There are essentially three hardening methods known from the prior art.

In the first method, the entire journal cross is case hardened. The journal crosses, which are forged from a low-carbon steel, are carburized to a carbon content of approximately 0.8% down to the desired hardening depth in a carbon-donating furnace atmosphere. The crosses are then quenched, with only the carburized surface layers becoming hard, while the core remains ductile. However, this operation is very time-consuming, energy-intensive and therefore also very expensive, on account of the long annealing times. Further, this method of hardening journal crosses is generally unsuitable, since the surface-layer hardening depth which can be achieved with acceptable outlay using this method is limited in absolute terms. The relative depth of the hardened layer decreases with the component size. However, for a high component load-bearing capacity, it is necessary for the stresses in the component to lie below the strength limit at all points below the surface. Therefore, for hardening large components, there is a tendency to try to use induction hardening, since it is known that in this way it is possible to achieve greater hardened depths.

To avoid these drawbacks, the second known method, which is described in DE 43 39 204 C1, simultaneously and cohesively surface-hardens the journal cross completely by induction in the region of the journal surfaces and the saddle surfaces between the journals arranged in a cross shape. For induction heating the journal cross over the entire surface region to the transformation temperature, the journal cross is rotated in the center of a toroidal, medium frequency alternating magnetic field. The toroidal alternating magnetic field is generated by a ring inductor, which has its axis inclined by approximately 45° with respect to the axis of rotation of the journal cross and is arranged approximately concentrically with respect to the center point of the journal cross. Therefore, to achieve uniform hardening, accurate positioning of the journal required. Furthermore, the structural design of the device required to implement this method is very complex and expensive. The hardened depth which is to be achieved corresponds to the theoretically desired hardened depth in the most highly stressed region. The surface treatment entails the deployment of more resources than necessary.

A further, third solution consists in the use of shaped inductors. As a representative example in this context, refer to EP 0 785 615 A1 and to the publication "W ämebehandlung" by Dr. Dieter Liedtke, Dr. Rolf Jönsson, expert-Velag, third edition, p. 104. In this case, the inductor at least partially surrounds the workpiece which is to be hardened. The workpiece executes a uniform rolling movement. The internal contour of the inductor, when the coupling state remains the same, represents a parallel to the rolling contour of the workpiece. The drawback of this hardening method for hardening journal crosses is that the hardening run-out zone, in which the mechanical properties of the component are generally adversely affected, always lies at the highly stressed points, i.e. in the region of the journal root. A further significant drawback is that, on account of the sequential hardening of the journals using cylindrical inductors, the previously hardened journal-root region is always adversely affected by the subsequent hardening.

DE 1 955 010 discloses a method with a device for the nonuniform tempering of the journal cross by induction heating. The journal cross is overall surface-hardened. Then the journals are tempered for 6–12 seconds at a temperature of 100–200° C. and to a hardness of 60–67 HRC, at the points of contact with the needles of the bearing, and the points of the journal cross which lie in the vicinity of the journal base are tempered for 6–12 seconds at a temperature of 450–650° C. and to a hardness of 50–56 HRC. The nonuniform treatment of individual regions may lead to previously treated surface regions being superimposed and therefore to some extent influencing one another.

SUMMARY OF THE INVENTION

The invention is therefore based on the object of providing a method for improving the mechanical properties of journal crosses for use in articulated shafts which avoids the drawbacks of the prior art which have been described. In particular, in addition to allowing the mechanical properties to influence one another in a reliable way in the regions which are actually subject to high loads, it is desired for the operations to take less time and for a device for carrying out the method to be of structurally simple and inexpensive design.

According to the invention, at least the peripherally oriented surface regions of the journal roots of the individual journals of a journal cross and of the transition surfaces, which are also referred to as saddle surfaces and function as connecting surfaces between two journals arranged adjacent to one another in the peripheral direction, are induction-hardened in one method step. There is no continuous surface-layer hardening of the entire journal cross in one operation, which would have to be designed for the theoretical maximum required hardening depth. Instead, the mechanical properties, in particular the hardness, are improved in a targeted way only in the regions which are actually exposed to high loads, i.e. the transition regions between the journal roots of two journals arranged adjacent to one another in the peripheral direction, which are exposed to dynamic bending loads. This can be achieved inexpensively and in a simple way.

An important advantage of this method is that the regions which are actually highly stressed, namely the region of the journal root, do not lie in the hardening run-out zone, so that the mechanical properties of a journal cross in this region are not adversely affected by the hardening operation. Furthermore, with this solution, even in the event of sequential saddle-surface hardening, the risk of the journal root region which has previously been hardened being adversely affected during the subsequent hardening, as occurs with sequential journal hardening using cylindrical inductors, is avoided. Also, this method is not limited with regard to the depth of the hardened layer, so that even large components can be hardened in a corresponding way with satisfactory results.

On account of the only partial hardening of the peripheral surfaces of the journal root of a journal of a journal cross, it is theoretically also possible for the individual journals to be hardened in succession, since, given suitable dimensioning of the journals, the hardening run-out zones produced during hardening of the saddle surfaces and of the surface regions of the journal roots which face in the peripheral direction are not superimposed on one another.

The hardening operation is followed by a tempering operation in order to reduce the brittleness.

For the device, it is possible to use conventional induction devices which do not have to specially match the shape of the surface region which comprises saddle surface and the journal surface regions facing in the peripheral direction. These devices may be individually assigned, at the required distance, to the saddle surfaces and the journal roots.

For this purpose, the device comprises a holding device for the journal cross and at least one induction device, which is assigned to the saddle surface between two journals which adjoin one another in the peripheral direction. The induction device comprises at least one coil unit, preferably in the form of a high-frequency coil. Its induced currents act on the surfaces of the journal in order to influence the mechanical properties in the edge regions of the component. In the process, the surface layer of the workpiece or of the component which is to be treated is heated in the relevant region by the currents induced by means of the high-frequency coil. After the austenitizing temperature has been reached, the surface layer is cooled, for example by being immersed in a cooling liquid which is composed on the basis of water. It is also conceivable for the cooling liquid to be showered onto the surfaces.

Differently designed inductors can be used to carry out the method. These inductors may be designed as specially shaped induction devices, which have substantially the same contour, with larger dimensions, as the surfaces to be treated, or as conventional inductors which are of geometrically simple design, are commercially available and are to be arranged in a suitable way.

In the first case, according to a further aspect of the invention specially shaped induction devices are used, which in each case at least partially wrap around the periphery of the surface of the journal root of a journal at a defined distance, which is preferably constant in the wrapped region.

For this purpose, for example, the coils may be arranged at regular intervals on a supporting element which is designed in the form of half of a ring or may themselves already be in such a shape.

In the other case, conventional coil elements are arranged at a defined distance from the surface which is to be treated, without there being any matching to the surface to be treated in terms of the arrangement. The alternating magnetic field which can be generated should, however, have a defined minimum frequency. This minimum frequency, which is preferably approx. 10 kHz, allows the rapid introduction of the heating energy generated by means of the coil into the journal cross even when there is a relatively great distance between the coil elements and the surface which is to be treated.

The method according to the invention is suitable for the heat treatment of journal crosses of different designs. The journal axes of the individual journals belonging to a journal cross preferably lie in a common plane. However, it is also possible to use the method according to the invention for journal crosses with journals which are offset with respect to one another. In this case, the journal axes are arranged in two planes which are offset with respect to one another and oriented parallel to one another, the intention being that the journal cross or the journals should be brought together during the hardening operation.

BRIEF DESCRIPTION OF THE DRAWINGS

The solution according to the invention is explained below with reference to Figures, in which, in detail:

FIG. 2 shows a diagrammatically simplified illustration of a device for carrying out the method.

DESCRIPTION OF A PREFERRED EMBODIMENT

Figure 1A:
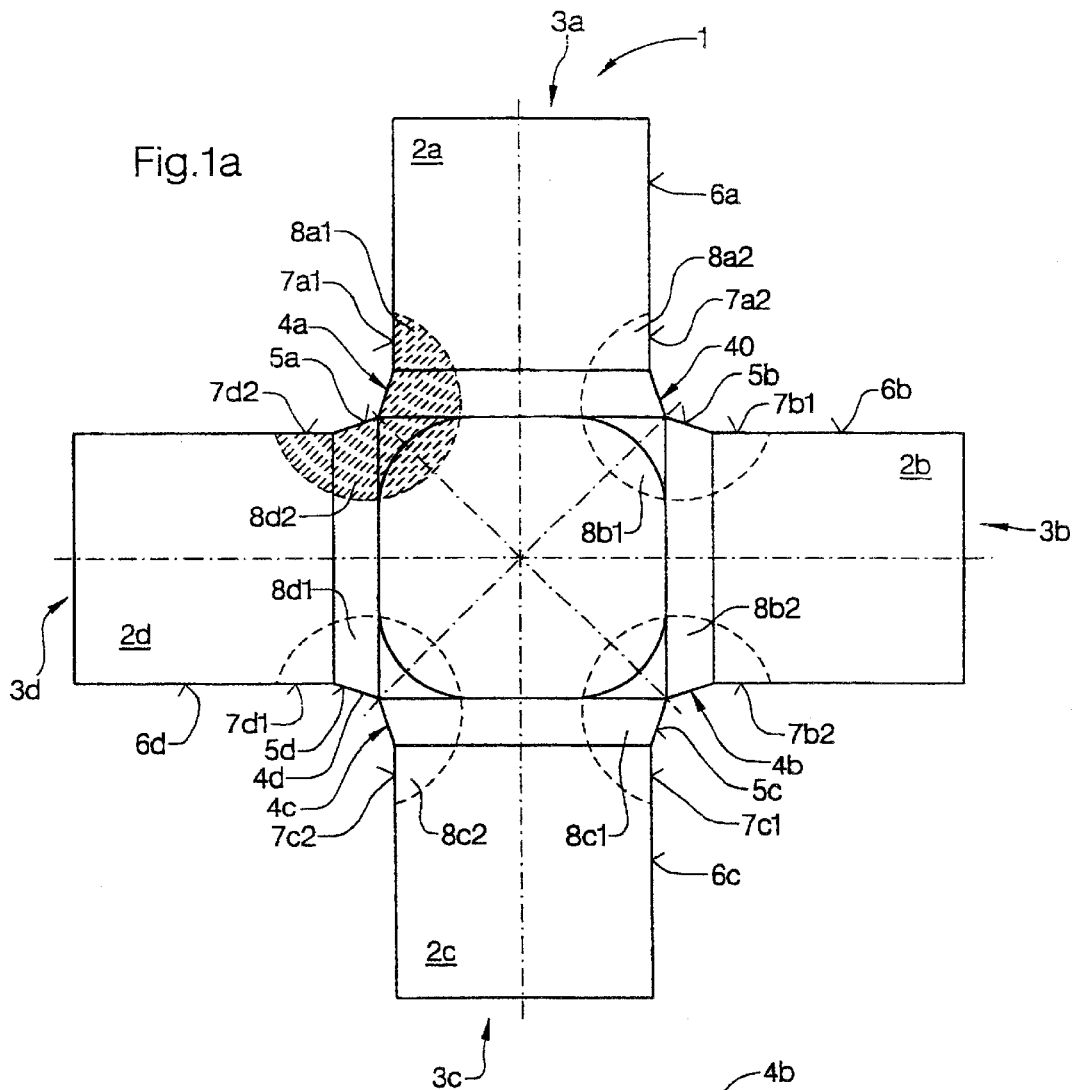
FIGS. 1a, 1b show diagrammatically simplified illustrations of a journal cross with a surface which has been treated in accordance with the invention.
Figure 1B:
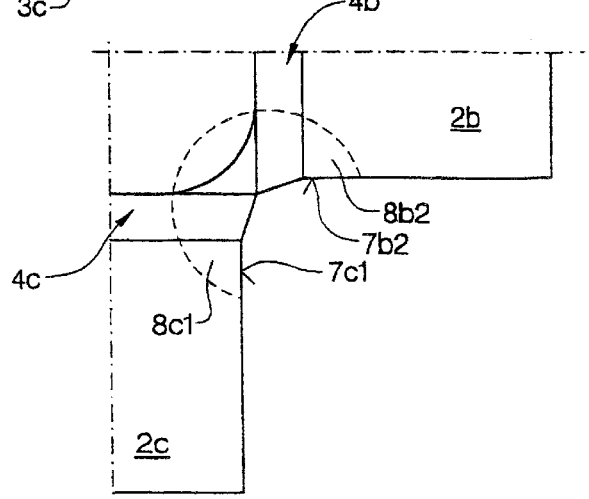

FIGS. 1a and 1b show diagrammatically simplified illustrations of a journal cross 1 for use in an articulated shaft, comprising the journals 2a to 2d which are in each case arranged offset through 90° with respect to one another, in a single plane. The journals 2a–2d are mounted, in their end regions 3a–3d which face away from one another, in a bearing bore of a flange carrier, in particular an articulated-yoke half. The journal roots are respectively 4a–4d, and the peripheral surfaces of the journals 2a–2d are respectively 6a–6d. In the region of the journal roots 4a–4d, corresponding transition surfaces, which are also referred to as saddle surfaces 5a–5d are arranged between in each case two journals 2a–2d which adjoin one another in the peripheral direction. According to the invention, at least the peripherally oriented surface regions 7a1, 7a2–7d1, 7d2 of the journal roots 4a–4d of the individual journals of a journal cross 1 which are located at the peripheral surfaces 6a–6d and the transition surfaces 5a–5d are induction-hardened. The resulting hardening run-out zones are denoted by 8a1, 8a2–8d1, 8d2 in the figure. FIG. 1b shows an enlarged view of part of a journal cross 1, in particular of the journals 2b and 2c of the journal cross shown in FIG. 1a.

FIG. 2 shows one possible design for a device 9 for carrying out the method according to the invention. The device comprises at least one holding device 10 for the journal cross 1 and an induction device 11, having at least one coil unit 12 by means of which the surface regions 7a1, 7a2–7d1, 7d2 at the peripheral surfaces 6a–6d of the journal roots 4a–5d are exposed to an alternating magnetic field. After the surface layer of the surface to be treated on the journal cross 1 has been heated by induced currents and after the austenitizing temperature has been reached, the surface regions which have been treated in this manner are quenched using a coolant.

In the situation illustrated, the holding device 10 and the induction device 11 are designed in such a manner that the individual surface regions between two journals 2a and 2b, 2b and 2c, 2c and 2d, 2d and 2a which adjoin one another in the peripheral direction in this case illustrated for 2a and 2c, which are characterized by the transition surfaces, in this case the surface 5d and the surface regions 7a 1 and 7d 2 which face toward one another in the peripheral direction, of the peripheral surfaces 6a and 6d, are individually hardened in succession, i.e. the journal cross 1 is rotated, or the coil unit 12 is rotated with respect to the journal cross.

In the other case, a plurality of coil units 12 are provided, with in each case one coil unit being assigned to the individual surface regions which are to be hardened between two journals 2a, 2b or 2b, 2c or 2c, 2d and 2d, 2a which adjoin one another in the peripheral direction.

| List of reference symbols | |
|---|---|
| 1 | Journal cross |
| 2a–2d | Journals |
| 3a–3d | End regions |
| 4a–4d | Journal root |
| 5a–5d | Saddle surfaces, transition surfaces |
| 6a–6d | Peripheral surfaces |
| 7a1, 7a2–7d1, 7d2 | Surface region |
| 8a1, 8a2–8d1, 8d2 | Hardened zones |
| 9 | Device |
| 10 | Holding device |
| 11 | Induction device |
| 12.1, 12.2 | Coil unit |

What is claimed is:

1. A method of improving mechanical properties, hardness and wear resistance of a journal cross, wherein the journal cross comprises a plurality of journals, each journal extending in a peripheral direction and each journal having a respective journal root from which it extends, a respective transition surface between the journal roots of adjacent journals, wherein the journal cross is for use in an articulated shaft; each transition surface between journal roots having a respective surface region, the method comprising induction hardening only the surface region described by the transition surfaces between two journals which adjoin one another in the peripheral direction; and after induction hardening the surface region, quenching the surface region by coolant.

2. The method of claim 1, further comprising simultaneously induction hardening all of the surface regions of the transition surfaces between the roots of adjacent journals.

3. The method of claim 1, further comprising exposing the surface regions to a tempering operation at 150–180° C. after the induction hardening, after the tempering operation, quenching the surface regions with coolant.

4. The method of claim 1, wherein each journal has an end region facing away from the respective journal root and which can be mounted in an articulated yoke, the method further comprising hardening the end regions of the journals in a separate hardening step.

5. A device for induction hardening the surface regions of transition surfaces between adjacent journal roots of journals of a journal cross, the device comprising a holding device for holding the journal cross; an induction device comprising at least one coil unit, wherein the coil unit is arranged at a defined distance from surface regions of the transition surfaces between adjacent journals so that operation of the coil unit induction hardening the surface regions of the transition surfaces, wherein the coil unit being shaped with dimensions generally corresponding to the surface regions and being disposed over those surface regions and the coil unit being operable for induction hardening those regions, the coil unit comprising a supporting element for two journals which adjoin one another in the peripheral direction, the supporting element at least partially wraps around a periphery of one of the journal roots of one journal and is at a distance therefrom, and at least one coil arranged on the supporting element.

* * * * *